United States Patent [19]
Jackson

[11] 3,756,636
[45] Sept. 4, 1973

[54] JOINT CONSTRUCTION FOR STRIP STRUCTURES

[75] Inventor: Norman C. Jackson, Lorain, Ohio

[73] Assignee: The Standard Products Company, Cleveland, Ohio

[22] Filed: Apr. 14, 1971

[21] Appl. No.: 134,017

Related U.S. Application Data

[63] Continuation-in-part of Ser. No. 787,043, Dec. 26, 1968.

[52] U.S. Cl........ 285/189.36 H, 287/54 C, 52/717, 296/84 R
[51] Int. Cl............................................. F16b 7/00
[58] Field of Search.............. 287/54 A, 54 B, 54 C, 287/189.36 H, 20.92 C, 20.92 D; 161/217, 219; 40/152; 52/716, 717; 296/84 R, 93

[56] References Cited
UNITED STATES PATENTS

| | | | |
|---|---|---|---|
| 3,467,423 | 9/1969 | Schlegel, Jr. et al. ...... | 287/189.36 H |
| 2,653,884 | 9/1953 | Hussey et al......................... | 161/217 |
| 1,444,229 | 2/1923 | Zahner.................... | 287/189.36 H X |
| 3,183,560 | 5/1965 | Brichard................ | 287/189.36 H X |
| 3,189,136 | 6/1965 | Stickney..................... | 287/189.36 H |
| 3,349,536 | 10/1967 | Halko et al. ........... | 287/189.36 H X |

FOREIGN PATENTS OR APPLICATIONS

| | | | |
|---|---|---|---|
| 243,638 | 2/1963 | Australia...................... | 287/20.92 D |

Primary Examiner—Jordan Franklin
Assistant Examiner—Wayne L. Shedd
Attorney—Meyer, Tilberry & Body

[57] ABSTRACT

A joint construction for plastic trim strip structures is disclosed in which a metal plate is positioned over and in engagement with the surfaces of abutting strip sections to be joined together. The plate is shaped to the general configuration of the joint to be formed and is bonded to the strip sections to form a firm interconnection with the strips. Securement of the metal plate is accomplished by coating the plate with a plastisol primer and heating the coated plate with a heating iron to bond the plate to the strip.

6 Claims, 7 Drawing Figures

PATENTED SEP 4 1973
3,756,636
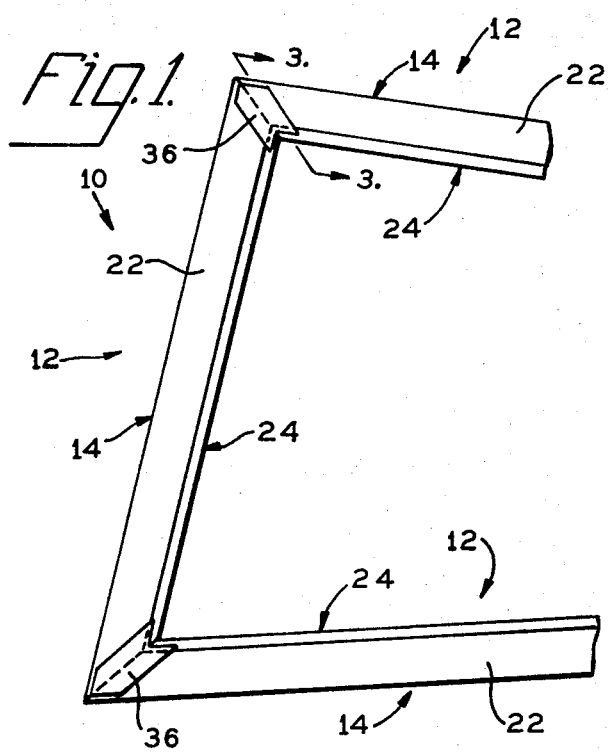
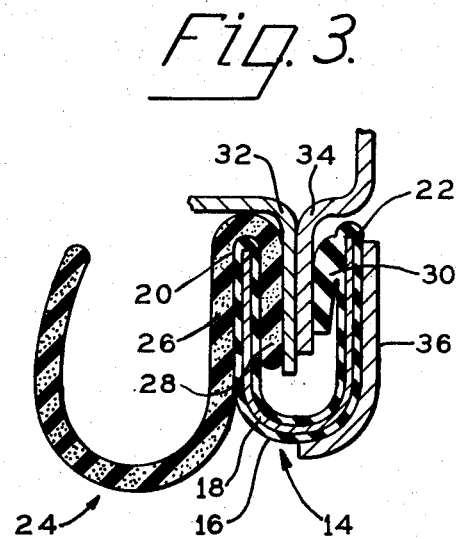
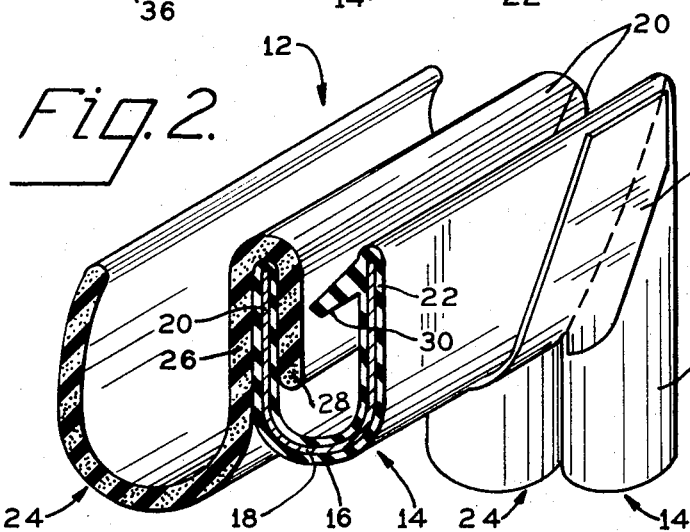
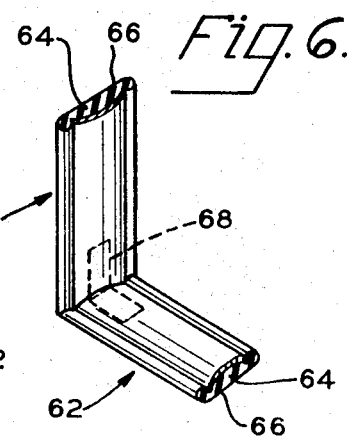
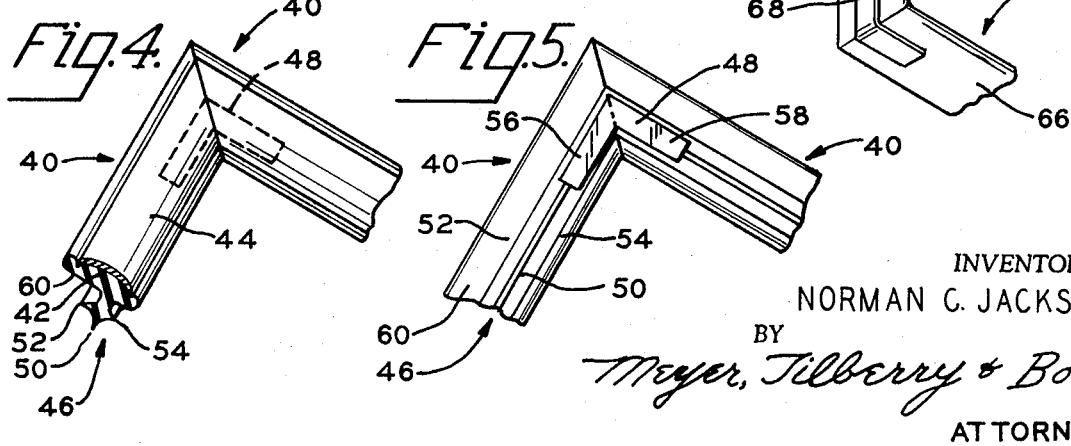
INVENTOR.
NORMAN C. JACKSON
BY
Meyer, Tilberry & Body
ATTORNEYS.

JOINT CONSTRUCTION FOR STRIP STRUCTURES

This application is a continuation-in-part of my co-pending application Ser. No. 787,043 filed Dec. 26, 1968.

This invention relates to the art of strip structures such as trim strips, seals, gaskets or the like and, more particularly, to joint or corner structures for automotive trim strips.

Although the invention is described herein with reference to a corner construction for joining automotive trim strips having specific constructions, it is to be understood that the invention has broader applications and may be usefully employed with other types and constructions of automotive trim strips and for purposes of forming joints other than corner joints.

Various types and shapes of plastic trim strips, gaskets, and seals have been developed for sealing automobile closures such as doors and windows, and for decorative purposes. Such trim strips are usually defined by a body of plastic material having an outer surface which may be decoratively contoured and/or provided with a decorative covering. further, automotive seals or gaskets of the character referred to generally include some type of relatively soft, resilient material to effect a seal between the closure member and the structure in which the closure opening is formed. It is frequently necessary that the trim strip, seal or gasket extend around corners of various angles. The trim strip, gasket or seal is often separately fabricated from a plurality of strip elements and subsequently installed or attached to a vehicle as a unit. Thus, it becomes most important to be able to construct the trim strip, gasket or seal unit in a manner whereby the correct configuration including all corners and angles is provided for, so that installation is facilitated and production or installation time is maintained at a minimum. Further, considerable emphasis is today placed on the decorativeness of interior and exterior vehicle trim both by the automotive industry and the buying public. Thus, it becomes extremely desirable to provide trim strip and seal structures which have contours uninterrupted by fastener elements and the like heretofore often required in the assembly and mounting of such trim strips and seals and in providing covers for joints between adjacent seal or trim strip components. The present invention is concerned with an improved joint construction, and in particular a corner joint construction, for automotive trim strips, gasket and seals and which construction provides the foregoing desirable characteristics.

In forming trim or seal strip corner constructions heretofore, various approaches have been employed. One such approach is to mold the corner portion of a seal, gasket or strip assembly as a separate component and thereafter join the ends of the corner portion to the ends of adjacent strip portions of the assembly. Typical ilustrations of such approaches are to be found in U.S. Pat. No. 2,503,882 and U.S. Pat. No. 2,794,221.

Although this prior art approach has proven generally satisfactory, it is a relatively expensive approach and the corner construction obtained does not always possess the necessary strength for the intended purpose. Moreover, the corner angle obtained with this approach is necessarily limited to the available molding techniques and is a substantially fixed angle which is too rigid to flex in order to conform with minor variations thereof from an underlying support surface to which it is to be attached, without stressing or distorting the strip material. When such a strip is bonded by adhesive or dielectric sealing, such stressing often causes the bond to be broken or the strip material to tear.

Another prior art approach has been a "cut and fit" approach in which the strip was cut and fitted by hand and cemented to an underlying support surface or around a door or window opening. However, this approach is relatively expensive due to labor costs and frequently results in improper installation of the strip and misalignment of strip components at points of joinder such as corner joints.

It is an outstanding object of the present invention to proviee an automotive trim or seal strip joint structure which is economical to construct.

Another object is to provide a joint structure of the above character which provides for an assembly of seal or strip components to have a highly decorative appearance.

A further object is the provision of a trim strip joint structure which has characteristics of strength such as to avoid separation of the strip components while permitting relative angular displacement of the components at the joint for the latter to conform to variations between th joint configuration and the contour of an underlying support surface.

Yet another object of this invention is to provide an automotive trim or seal strip joint construction, and in particular a corner construction, which obviates the necessity for separately molding the joint structure.

It is a further object of this invention to provide a corner construction for strip structures of the above character which enables the prefabrication of strip assemblies to any desired angular configuration.

More specifically, it is an object of thi invention to provide a corner construction for a strip structure in which mitered ends of two lengths of strip material may be brought into engagement and joined together by reinforcing metal plate means secured to and overlapping both of the adjacent ends, thereby both joining and reinforcing the formed corner construction.

Still more specifically, this invention contemplates strip structures of vinyl material joined together at their ends in abutting relationship. Strip structures of the character herein referred to are distinguished from plastic tapes and sheet material which are extremely flexible. In this respect, the strip structures have substantial body or thickness or are structurally modified by metal reinforcing core means so that the strips, while flexible, have a degree of rigidity not possessed by thin tapes and sheets. A metal plate generally shaped to conform to the configuration of the desired corner is coated with a plastisol primer and bonded to the vinyl strips at their point of abutment with portions of the metal plate overlapping and being secured to the ends of both strips, thereby securing the strips in position and reinforcing the formed corner.

In a broader aspect, this invention contemplates a joint construction for lengths of flexible, non-metallic strips in which a plate means is positioned over and in engagement with the surfaces of the strips to be joined together. The plate means is then secured to the strips, as by bonding or the like, to form a firm interconnection between the strips.

Other objects, features, and advantages of this invention will become more apparent upon a complete reading of the following description which, together with the attached drawings, describes but a preferred embodiment of the invention. It is not intended that the illustration of such embodiment or the terminology employed in describing it is to be limiting.

Referring now to the drawings, wherein like reference numerals indicate like parts in the various views:

FIG. 1 is a partial side elevation view of a quarter window seal and trim assembly employing the present invention;

FIG. 2 is a perspective view, partially in section, of a corner joint of the assembly of FIG. 1;

FIG. 3 is a sectional view taken along line 3—3 of FIG. 1 and illustrates the strip in associated with mounting means therefor;

FIG. 4 is a perspective view of an alternate form of the corner construction as applied to a trim strip assembly and illustrating the outer surface of the assembly;

FIG. 5 is a bottom view of the assembly of FIG. 4;

FIG. 6 is a perspective view of yet another form of corner construction for a trim strip assembly; and FIG. 7 is a bottom view of the assembly of FIG. 6.

Referring now in more detail to the drawings, there is illustrated in FIGS. 1, 2 and 3 a quarter window seal and trim assembly which employs a corner joint constructed in accordance with the present invention. Although a specific construction of the seal and trim assembly is illustrated, it is to be understood that the specific seal and trim combination form no portion of this invention and are for purposes of illustration only.

The seal and trim assembly, indicated generally by the reference numeral 10, comprises a plurality of strip sections 12 having the adjacent ends thereof mitered so that the assembly has a contour corresponding to that of the frame of the vehicle window opening about which the assembly will extend. Strip sections 12 are identical in cross-section and in this respect include a trim portion 14 defined by a U-shaped vinyl body 16 in which there is embedded a U-shaped metal core 18. The U-shaped configuration of the trim portion provides legs 20 and 22 defining a channel which facilitates mounting of the strip, as set forth more fully hereinafter. Trim portion 14 preferably is produced by extrusion of the vinyl about core 18, but may, of course, be otherwise produced.

In combination with trim portion 14 is a sealing portion 24. Sealing portion 24 may be fabricated from any suitable elastomeric material and preferably is a sponge rubber or other rubber-like material. Sealing portion 24 includes integral leg portions 26 and 28 disposed on opposite sides of leg 20 of trim portion 14 and suitably secured thereto by, for example, heat sealing or adhesive bonding. Leg 22 of trim portion 14 may be provided with a rib 30 extending toward leg 20. Legs 20, 22 and 28 together with rib 30 facilitate mounting of strip 12 on support means therefor on the vehicle such as the flange means defined by flanges 32 and 34 in FIG. 3. Such flange means extends about the window frame opening. When so mounted, trim portion 14 is exposed to view and sealing portion 24 is positioned to be sealingly engaged by the closure member.

To employ the seal and trim assembly 10 with a closure such as a window, it is necessary that the assembly extend around the entire periphery of the window opening thereby to provide an effective seal for the window. This is accomplished, as partially shown in FIG. 1, by interconnecting a plurality of separate strip sections 12, which sections are joined in an angular relationship to form a continuous assembly conforming to the contour of the window opening.

In accordance with the principles of this invention, it is contemplated that the strip sections 12 may be jointed together in the following manner. Thus, referring to FIGS. 1 and 2 adjacent ends of sections 12, including both trim portion 14 and seal portion 24, are mitered to form a corner of the desired angular relationship. To join the two vinyl bodies of the adjacent trim portions 14 of the sections 12, a metal clip or plate 36 is employed. Plate 36 may be any suitable metal, such as steel. As is apparent from FIGS. 1 and 2, the metal plate 36 is shaped to conform generally to both the configuration of the exterior surface of the corner being formed and the angle between the strip sections. To secure the plate 36 to the strips, the plate is coated with an appropriate plastisol primer and is then positioned over the mitered junction between the adjacent sections 12 with a portion of the plate overlying each of the adjacent two ends of trim portions 14 of sections 12. The metal plate is then heated and bonded to the vinyl bodies of the trim portions thereby joining the two ends in a firm relationship. The adjacent ends of sealing portions 24 may, if desired, be interconnected by adhesive bonding, vulcanizing, or the like.

Precisely the same arrangement is employed for each corner construction joining adjacent ends of two strip sections 12. However, it will be appreciated that there may be a difference in angular configuration of a particular corner, whereby a somewhat different configuration of the metal plate will be employed. Further, the width and length dimensions of the metal plate will vary depending on the dimensions of the trim portions, and the thickness of the plate will vary in accordance with the size and configuration of the trim portions and the joint strength desired.

It will be appreciated that plate 36 may be exteriorly configured or decorated to conform with the appearance of vinyl body 16, or that body 16 may be provided with a decorative covering such as a layer of metallized Mylar to conform in appearance with plate 36. In any event, a joint is defined which blends with the strip sections.

A simple, yet novel, method of securing the plate 36 to the plastic strips has been devised. This method contemplates coating the plate 36 with a plastisol primer of the type normally applied to metal prior to the application of a liquid plastisol coating to improve the performance of the bond between the plastisol and the metal when the plastisol is fused. However, rather than using the primer with a liquid plastisol, it is contemplated that the primer will be used as the bonding agent by which the metal plate is caused to adhere to a solid extruded vinyl strip. Thus, the plate 36 is coated with a plastisol primer and the primer may be allowed to dry to facilitate subsequent handling. Depending on the specific primer employed, a heat cycle may be required to dry the primer. After the primer has dried, the primer coated plate is placed in position across the joint between strip sections 12 and heat is applied to the plate causing the primer to bond the plate to the surface of the extruded vinyl strip.

It is contemplated that the head applied to the plate may be supplied by a suitable device such as a hand heating iron or a soldering iron which may be pressed against the plate and passed thereover to effect the necessary heat transfer to cause the bonding to occur.

It will be appreciated that the described method merely requires a supply of liquid plastisol primer and a simple heating iron. With these supplies, a metal plate may readily be applied to a pair of plastic strip sections.

The step of drying the primer coated plate before it is applied and heated is optional. The primary advantage of drying the primer is to facilitate handling of the plate; however, where the plate is to be applied to the strip almost immediately after the priming operation, the drying step may be omitted.

Various types of plastisol primers may be employed with the heating and curing times and temperatures being adjusted according to the characteristics of the particular primer employed. One specific plastisol primer that has proven satisfactory is marketed by the Sherwin Williams Company, Cleveland, Ohio under the designation P66CAl. The P66CAl primer is a modified acrylic which is soluble in methylethyl ketone and toluene and has the following physical composition:

Weight per gallon — 7.43 lb.
Weight solids — 20.4 percent
Volume solids — 14.8 percent However, any plastisol primer that will cure to give a bond between the metal and the extruded vinyl which will withstand a peel test of 15 pounds per inch of width is satisfactory.

It is to be understood that various configurations of metal plates may be used. Thus, referring to FIGS. 4 and 5, there is illustrated a similar arrangement in which a pair of trim strip sections 40 are interconnected in accordance with the present invention. In this embodiment, trim sections 40 are defined by an extruded vinyl body portion 42 having an arcuate outer face which may itself be decoratively embossed or which may be provided with a decorative covering such as a strip of metallized polyethylene terephthalate 44. Body portion 42 may have a substantially flat bottom surface to facilitate mounting thereof on an underlying surface such as by dielectric sealing or adhesive bonding, or the bottom may have rib means similar to rib 46 adapted to cooperatively engage slot means in an underlying support surface to retain the trim section in place relative thereto. In any event, the present invention provides for a trim strip assembly of sections 40 to be constructed in a manner whereby the joint between adjacent sections is strong and yet is free of any fasteners such as screws or the like which would interrupt the continuous uniform decorative appearance of the outer surface thereof. In this respect, adjacent ends of sections 40 are mitered to define a desired angular relationship between the sections, are disposed in abutting disposition and are joined in the manner hereinbefore defined by means of a metal plate 48 which may, for example, be a steel plate dimensioned to provide a substantially rigid joint between the trim sections. In the embodiment illustrated, plate 48 is disposed in a recess in rib 46 defined by cutting away a section of leg 50 of the rib so that the plate is bonded to a flat section defined by legs 52 and 54 of rib 46. It will be noted that the angular plate 48 has legs 56 and 58 which are of a width less than the lateral distance between the side edges or rib legs 52 and 54, whereby the metal plate performs its bonding function without interfacing with the mounting function of rib 46. It will be appreciated, of course, that rib 46 could be cut away to the plane of bottom surface 60 and that plate 48 could be bonded to the bottom surface.

It will be appreciated that trim, seal or gasket sections can be joined in axial alignment to great advantage in accordance with the present invention to provide continuity of surface appearance in the area of the joint, and that angular corner configurations other than the planar configurations of FIGS. 1–5 can be constructed. For example, with reference to FIGS. 6 and 7 of the drawing, a pair of trim strip sections 62 are joined in a manner whereby the planes thereof are angularly disposed. Sections 62 may be similar to sections 40 hereinbefore described, but are illustrated as being comprised of bodies 64 of vinyl material having substantially flat bottom surfaces 66. In this embodiment, adjacent ends of sections 62 are mitered at an incline to the plane of the corresponding bottom surface and are interconnected in the manner hereinbefore set forth by an angular metal plate 68. Bottom surfaces 66 may, if desired, be provided with recesses to receive the legs of plate 68. Such recessing would, of course, enhance mounting of the strip assembly if such mounting is to be achieved by adhesive bonding or dielectric sealing.

It is belived apparent that the above described construction has several advantages. Thus, it is no longer necessary to form a trim strip corner construction as a separate element which is subsequently joined to other strips, nor is it necessary to separately mold such a corner. With the described arrangement, the strips may be made in continuous lengths and, when it is desired to form a particular angular construction, it is necessary only to sever the strips to define sections of desired lengths, miter the ends of the sections, coat the metal plates with plastisol primer and apply the metal plates to interconnect the sections. In addition to being extremely economical to produce and assemble it will also be appreciated that the resulting joint has much improved strength characteristics and can be flexed or displaced to conform to an underlying support surface without stressing or distorting the decorative surface thereof. Other distinct advantages of the described structural arrangements are that a corner construction of almost any angular configuration may be readily formed, and an entire trim assembly can be constructed as a independent unit and then mounted in its position of use on a vehicle.

It will be appreciated that the concept of bonding a metallic member to non-metallic members to form a joint has broader applications than just forming corners. Obviously, the same method and essential structural arrangement may be employed to join lengths of strips in end-to-end relationship and this application is fully encompassed within the principles of this invention. Moreover, a multiplicity of strips might be joined together in this manner. For example, three or more strips might be joined together at their ends at a common point by the disclosed method with the metal plate overlying and being bonded to each strip, much like a gusset plate.

The principles of this invention are also adapted to joining the end of one strip to another strip intermediate its end thereby to form a T-shaped joint.

Modifications and alterations in the described invention will suggest themselves to those having ordinary skill in the art and it is intended that such modifications and alterations are to be included within the scope of the invention as defined by the appended claims.

I claim:

1. A trim strip corner joint construction between at least two lengths of trim strip formed of resilient, synthetic polymeric resinous material mountable on a motor vehicle body and each said length of trim strip having an exterior surface which is exposed when a strip is mounted on the vehicle body and having a second exterior surface adapted to face the vehicle body, comprising: said trim strips being angularly disposed in end-to-end relationship, a metal plate element of corresponding angular configuration extending across the adjacent ends of said strips and having portions in surface-to-surface contact with portions of corresponding ones of said exposed and second exterior surfaces of said trim strips, said portions of said metal plate extending only in the longitudinal direction with respect to the corresponding ones of said exposed and said second surfaces and having a transverse width no greater than the transverse width of the portions of said corresponding ones of said exposed and second exterior surfaces, and non-metallic adhesive means bonding said metal plate to said portions of said corresponding ones of said exterior surfaces for said metal plate element and adhesive alone to interconnect said adjacent ends of said trim strips.

2. The joint construction according to claim 1, wherein said synthetic polymeric resinous material is vinyl, and said adhesive means bonding and metal plate element to said corresponding ones of said exterior surfaces is a plastol primer coating on said plate element.

3. The joint construction according to claim 1, wherein said metal plate element overlies the exposed exterior surfaces of said adjacent ends of said trim strips, said exposed exterior surfaces having a non-planar cross sectional contour, and said metal plate element being contoured to conform to the contour of said exposed exterior surfaces.

4. The joint construction according to claim 3, wherein said synthetic polymeric resinous material is vinyl, and said adhesive means bonding said metal plate element to said exposed exterior surfaces is a plastol primer coating on said plate element.

5. A trim strip corner joint construction between at least two lengths of trim strip formed of resilient synthetic polymeric resinous material mountable on a motor vehicle body and each said length of trim strip having an exterior surface of non-planar cross-sectional contour which is exposed when the strip is mounted on the vehicle body and a second exterior surface adapted to face the vehicle body, comprising: said strips being disposed end-to-end and having the adjacent ends thereof mitered to form an angle between said trim strips and for said adjacent ends to have opposed abutting end faces, a thin metal plate element extending across the adjacent ends of said strips and having a portion in surface to surface contact with a portion of the exposed exterior surface of each strip adjacent said end faces, each portion of said metal plate element extending only in the longitudinal direction with respect to the corresponding exposed exterior surface and having a transverse width no greater than the transverse width of the corresponding exposed exterior surface, and non-metallic adhesive means bonding said metal plate to said portions of said exterior surfaces for said metal plate and adhesive means alone to interconnect said adjacent ends of said trim strips.

6. A joint construction according to claim 5, wherein said synthetic polymeric resinous material is vinyl, and said adhesive means bonding said metal plate element to said portions of said exterior surfaces is a plastol primer coating on said plate element.

* * * * *